May 12, 1959  J. M. MURRAY  2,885,807
SMOKE PRODUCING DISPLAY DEVICE
Filed June 24, 1957  3 Sheets-Sheet 1

INVENTOR.
JOHN M. MURRAY
BY
Tellers & McCormick
ATTORNEYS

INVENTOR.
JOHN M. MURRAY
BY
Teller & McCormick
ATTORNEYS

May 12, 1959  J. M. MURRAY  2,885,807
SMOKE PRODUCING DISPLAY DEVICE
Filed June 24, 1957  3 Sheets-Sheet 3

INVENTOR.
JOHN M. MURRAY
BY
Teller & McCormick
ATTORNEYS

United States Patent Office 2,885,807
Patented May 12, 1959

2,885,807

SMOKE PRODUCING DISPLAY DEVICE

John M. Murray, Bloomfield, Conn., assignor to Grant-Murray, Inc., Hartford, Conn., a corporation of Connecticut Application June 24, 1957, Serial No. 667,626

9 Claims. (Cl. 40—106.22)

This invention relates to mechanism or apparatus for producing smoke or the illusion of smoke, and a structure provided in accordance with the invention comprises a small scale display model of a home or other building and the structure is operated and displayed to more forcibly acquaint the public with the danger of fire and with the desirability of proper fire protection.

It is the general object of the invention to provide apparatus of the aforedescribed type which is safe and foolproof in operation and which can be operated for long periods of time without maintenance or attendance and which can be operated for timed cycles to show in an eye-catching manner a model home which periodically catches fire or, by illusion, seems to catch fire and burn.

The drawings show a preferred embodiment of the invention and such embodiment will be described, but it will be understood that various changes may be made from the construction disclosed, and that the drawings and description are not be be construed as defining or limiting the scope of the invention, the claims forming a part of this specification being relied upon for that purpose.

Figure 1:
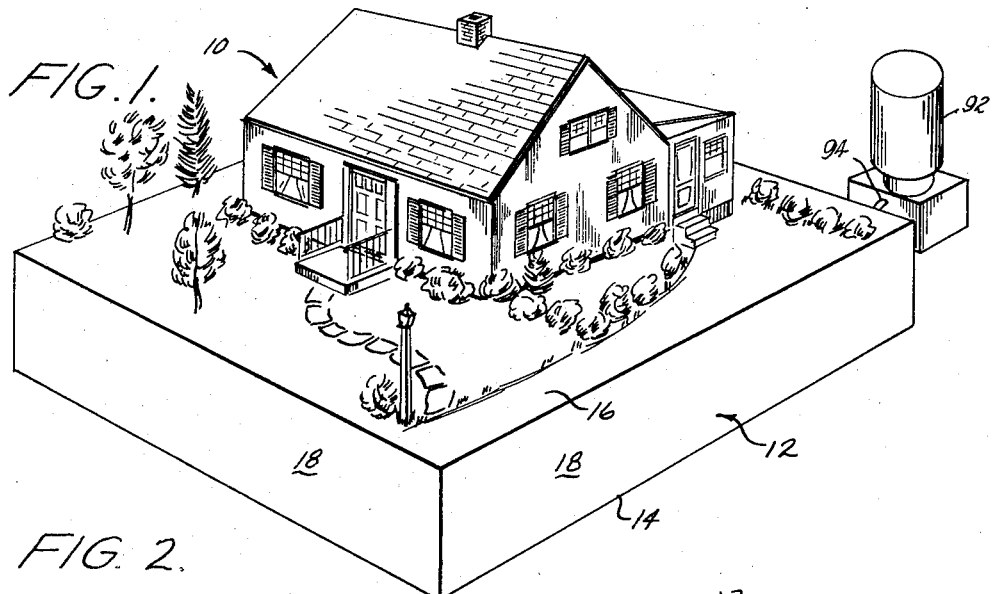
Fig. 1 is a perspective view of a small scale display model home constructed in accordance with the present invention and wherein the smoke producing apparatus and mechanism of the invention is incorporated.

A presently preferred form of construction in accordance with the present invention comprises a small scale model 10 of a home of conventional design which is supported upon a box-like base 12. The base 12 is generally rectangular and has a bottom wall 14, a top wall 16 and a plurality of vertical walls 18, 18. The model home 10 is supported and built upon the top wall 16 of the base 12 and the said top wall is preferably painted or otherwise artistically fabricated to duplicate a scenic lawn or yard where the model home 10 is the principal structure. The smoke producing apparatus is housed within the base 12 and the smoke produced thereby rises through a suitable opening provided in the top wall 16 and within the model home 10 so as to flow outwardly through the window and door openings thereof.

The entire structure including the model building 10, the base 12 and the smoke producing apparatus therein is of such size that it can conveniently be placed upon a table or desk top for display and demonstration. As will be explained in greater detail hereinafter, the operating apparatus includes an electric lamp which when lighted creates the illusion that the model home is occupied and lighted from within. The aforedescribed "normal" condition will maintain for a selected time interval and then timing mechanism forming a part of the smoke producing apparatus extinguishes the white light and lights a red lamp which creates the illusion of fire within the home. Means are incorporated in the apparatus to make the red or "fire" light flicker to enhance the illusion of fire and means are incorporated to produce smoke which rolls or flows from the windows and other building openings during a timed period of "fire" operation. The wiring circuit for the smoke producing and fire illusion apparatus is preferably arranged so that one electric advertising sign can be lighted during the "normal" operation, and another sign lighted during the "fire" period of the cycle.

Figure 2:
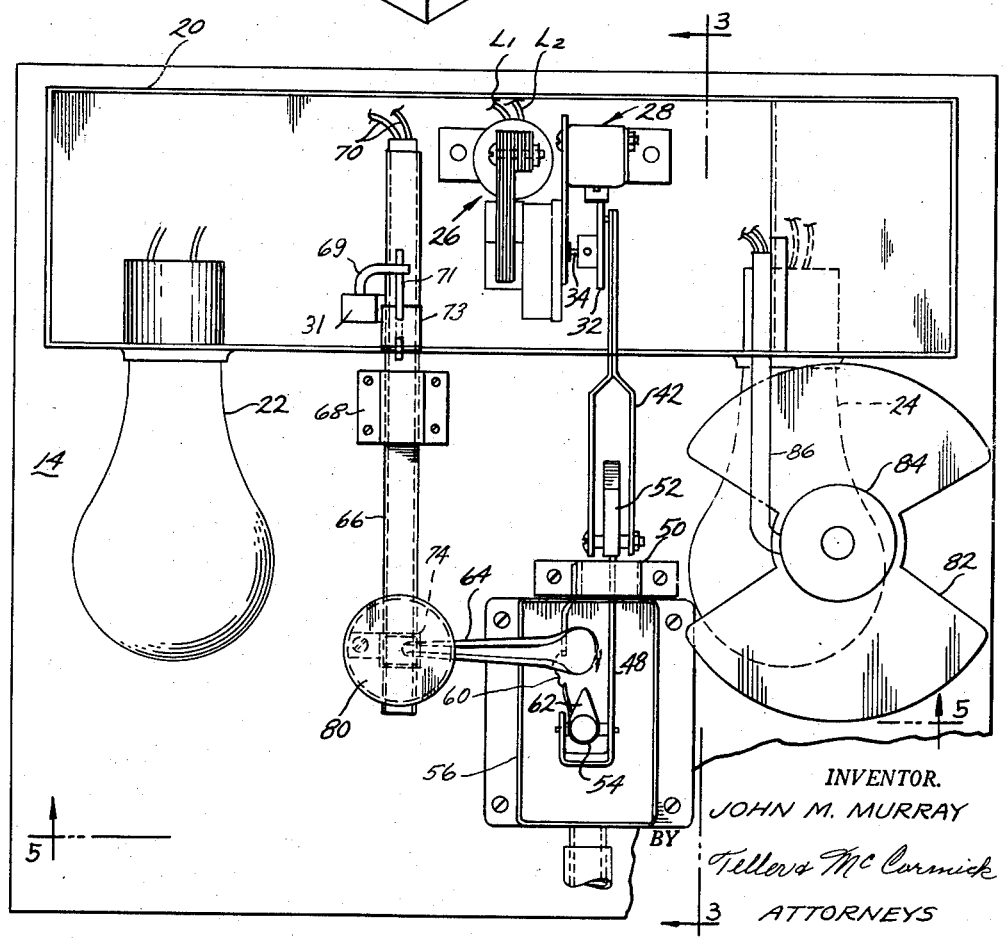
Fig. 2 is a top plan view of the smoke producing apparatus incorporated in the construction of the base of the model home shown in Fig. 1.
Figure 3:
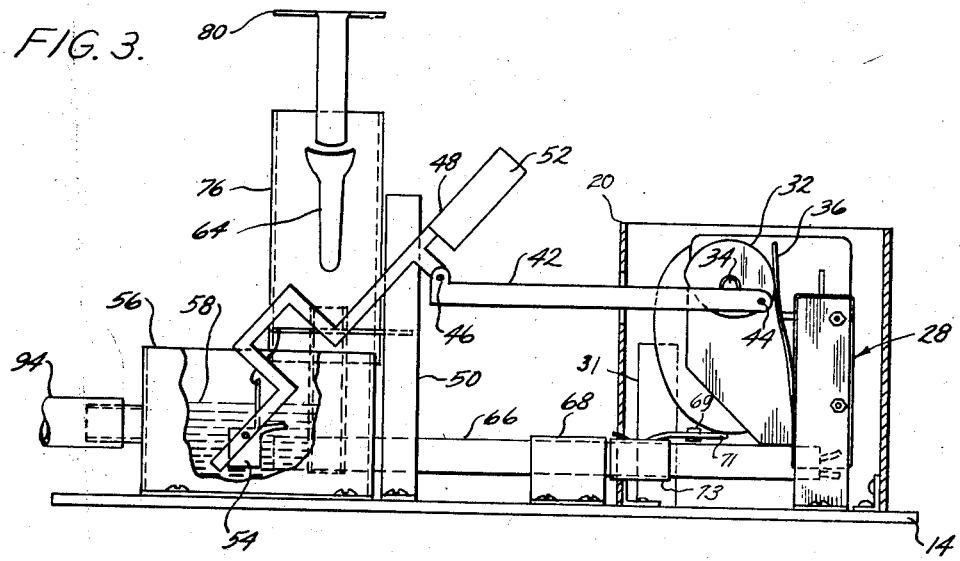
Fig. 3 is a vertical sectional view taken as indicated by the line 3—3 of Fig. 2.
Figure 5:
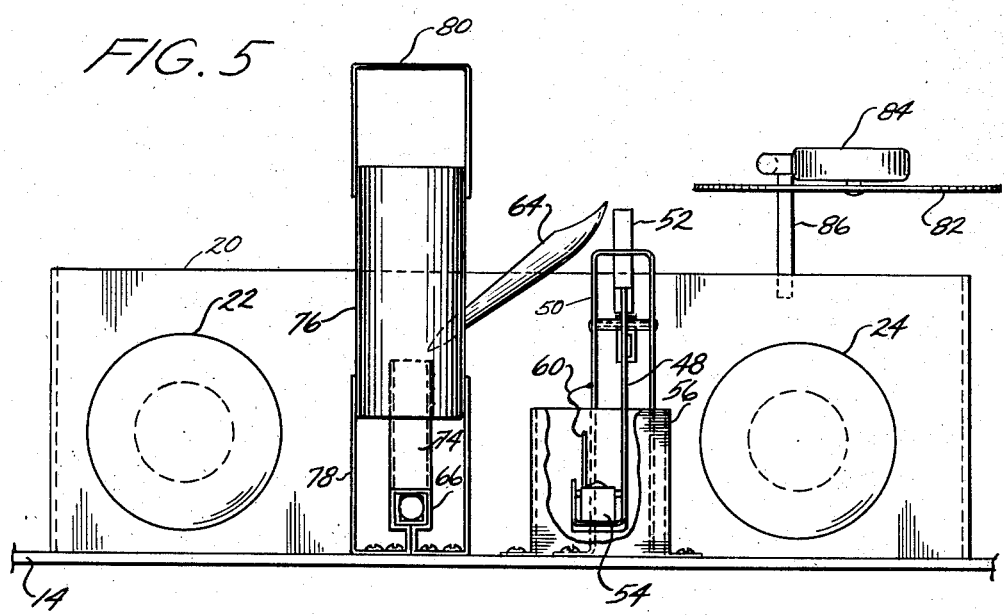
Fig. 5 is another vertical sectional view of the apparatus taken as indicated by the line 5—5 of Fig. 2.

As best shown in Figs. 2, 3 and 5, the smoke producing and fire illusion apparatus includes a box 20 which is supported on the bottom wall 14 of the base 12 adjacent the rear end thereof and the said box 20 provides a suitable mounting or fixture for a plurality of conventional electric lamps or bulbs 22 and 24 and for an electric timer motor 26. The lamp 22 is preferably white or produces a white light and the lamp 24 is red or produces a red light and the timer motor 26 is utilized to operate switch means to energize the white light 22 during the "normal" peroid of the cycle and to energize the red lamp 24 during the "fire" period of the cycle. The timer motor 26 is of conventional construction and preferably comprises a synchronous motor. The switch 28 which is operated by the timer motor 26 is also conventional construction and operates in the usual way to switch from the white lamp to the red lamp 24 as will be described. The timer motor 26 is connected with a suitable source of electrical energy through a pair of conductors L1 and L2 (Figs. 2 and 6) so that the timer motor 26 will operate continuously whenever a start switch 30 disposed in one of the conductors is closed or in the "on" position and whenever a normally open thermoresponsive switch 31 is closed as will be described hereinafter.

As best shown in Fig. 3, a cam 32 is secured to the shaft 34 of the timer motor 26, the said cam having a periphery which engages a spring tempered actuating arm 36 for the switch 28. The periphery of the cam 32 is contoured to displace the spring arm 36 and place the switch 28 as shown in the wiring diagram of Fig. 6 against a contact 38 for "normal" operation to energize the white lamp 22 or to place the switch in engagement with a contact 40 for "fire" operation so as to energize the red lamp 24. The cam contour causes the switch 28 to dwell for a selected period or timed interval against the contact 38 for "normal" operation and to dwell against the contact 40 for "fire" operation during each revolution of the timer motor 26.

Figure 4:
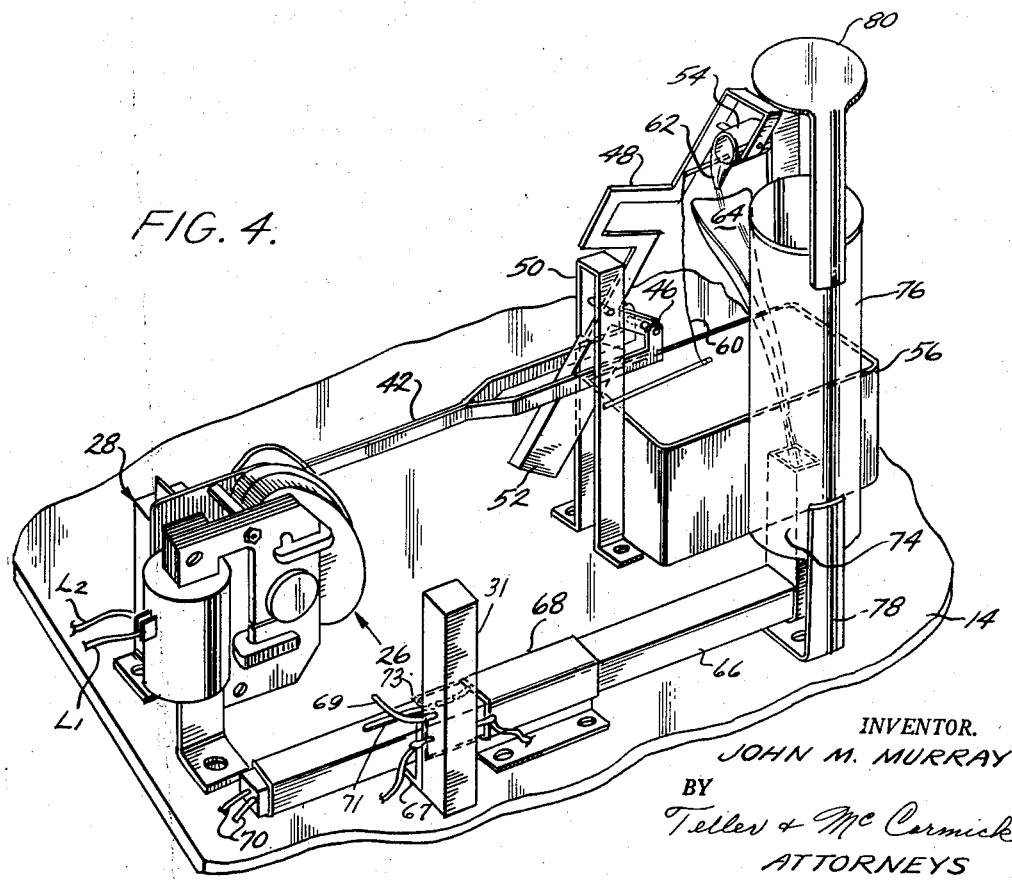
Fig. 4 is a perspective view of the smoke producing apparatus.

In addition to operating the switch 28 for movement between normal and fire positions, the cam 32 pivotally mounts one end of a connecting rod 42 in the smoke producing mechanism best shown in Fig. 4. The said one end of the connecting rod 42 is pivotally connected as by a pin 44 on the cam plate 32 in eccentric relationship with the shaft 34 of the timer motor 26. The other end of the connecting rod 42 is bifurcated and is pivotally connected as indicated at 46 with a loading arm 48 which is pivotally supported between its ends by a vertical bracket 50 secured to the bottom wall 14 of the base 12. Thus, the rotation of the timer motor 26 and reciprocation of the connecting rod 42 is translated to oscillation in a vertical plane of the pivotally supported loading arm 48.

A counterweight 52 is secured to one end of the loading arm 48 to balance the other end thereof which is adapted to pivotally support a loading bucket 54. When the reciprocable connecting rod 42 is pushed in one direction to the extreme point of its travel (as shown in Fig. 3), the said other end of the loading arm and the bucket 54 are submerged in a tank 56 containing the smoke producing liquid solution 58, and when the connecting rod 42 is thrust in the other direction to the extremity of its travel (as shown in Fig. 4), the said other end of the loading arm 48 is elevated so that the bucket 54 can be tilted to spill its contents into a smoke producing heater as will be described.

It should be understood that while the preferred smoke producing medium 58 is a liquid, other smoke producing material such as a powder may be used and the bucket 54 or its equivalent will pick up and transfer the powder. The bucket 54 is gravity biased so that the contents will not inadvertently spill therefrom, but a string or the like 60 connected to the vertical bracket 50 and to the bucket 54 is arranged as shown to tilt the bucket 54 when the said "other" end of the loading arm is elevated. Preferably, the bucket 54 is provided with a pouring spout 62 to direct the flow of the contents therefrom onto an inclined trough 64 which causes the smoke producing material to flow into a smoke producing heater which will now be described.

The heater which is utilized to produce the smoke is of the electrical resistance type and comprises an elongated insulating body 66 which is supported in a substantially horizontal position as by a bracket 68 secured to the bottom wall 14 of the base. One end of the body 66 projects into the box 20 and has suitable electrical conductors 70, 70 for connecting the heater in parallel with the timer motor 26 whereby the heater is energized whenever the start switch 30 is closed or in the "on" position. An electrical resistance 72 (Fig. 6) is disposed at the other end of the body 66 and connected with the conductors 70, 70 and an open vertical stack 74 is provided adjacent and around the resistance 72. The smoke producing liquid or other smoke producing material is introduced through the top end of the vertical stack 74 by means of the inclined trough 64, the smoke producing liquid or material being adapted to convert to a non-toxic smoke-like gas when heated. Preferably, the vertical stack 74 is provided with a fine mesh screen and other filtering material such as pummice powder to cause the few drops of liquid introduced from the bucket 54 and trough 64 to seep into the heating area wherein it is converted to gas. Thus, during each revolution of the timer motor 26 which causes one oscillation of the loading arm 48, a small quantity of the smoke producing liquid is introduced to the smoke producing heater to provide a relatively dense and dark cloud of smoke-like gas.

A generally cylindrical vertically disposed shield 76 surrounds the stack 74 in spaced relationship and extends thereabove to direct the smoke upwards. The cylindrical shield 76 is supported by bracket means 78 attached to the bottom wall 14 of the base 12, and a diffusing plate 80 is supported by the shield 76 in spaced relationship thereover to diffuse the vertically rising column of smoke. Preferably, the top of the vertically disposed cylindrical shield 76 projects into the model building 10 so that the smoke is diffused within the building and can pour from all window openings and other openings provided therein.

Figure 6:
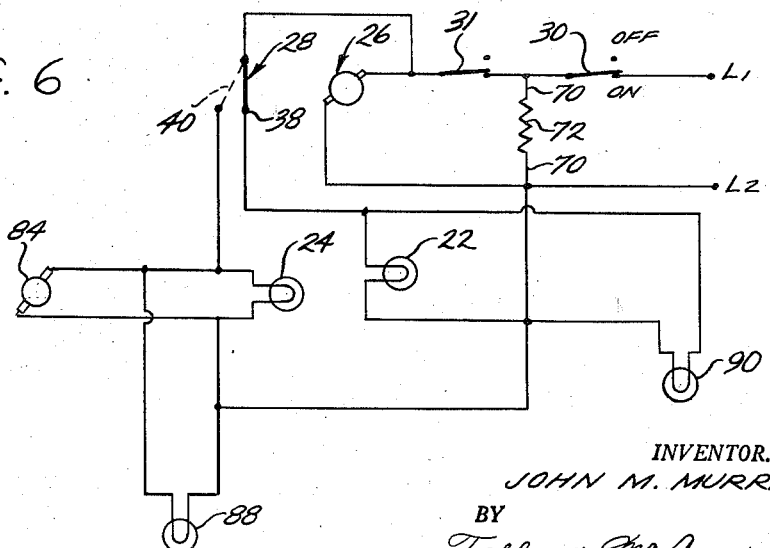
Fig. 6 is a wiring diagram of the smoke producing display apparatus.

Obviously, it would not be desirable to have the timer motor 26 in operation to actuate the aforedescribed motion transmitting means which feeds the smoke producing substance to the heater unless and until the heater is energized and sufficiently hot. If the heater is not energized and the smoke producing substance is continuously introduced thereto, spillage will occur, and if the substance is introduced to the heater before it is sufficiently hot, the heater will become flooded and smoke will be produced during initial operation for more than the "fire" period. The thermoresponsive switch 31 is located in the circuit diagram as shown in Fig. 6 and is arranged to be closed only when the heater resistance 72 is energized and is sufficiently hot. As shown in Figs. 2 and 4, the switch 31 is of conventional construction and is supported within the base 12 adjacent the heater body 66 on a bracket 67. An actuating arm 69 for the switch 31 is engaged and operated by a bimetallic arm or strip 71. The bimetallic strip 71 is secured as by a bracket or clamp 73 to the heater body 66 so as to be responsive to the heater temperature. The bimetallic strip 71 and the switch actuating arm 69 are arranged so that the switch 31 will be closed at a preselected or predetermined heater temperature and the switch 31 will be opened at a predetermined lesser temperature.

Thus, with the thermoresponsive switch 31 connected in the wiring circuit as shown in Fig. 6, the timer motor 26 will be energized to start the timed "normal" and "fire" periods of operation and to feed the smoke producing substance to the heater only when the heater reaches a sufficiently high temperature. If the heater should burn out or become inoperative for any reason, the switch 31 will automatically be opened to deenergize the timer motor and the entire circuit.

As previously mentioned, it is desirable to have the red light flicker during the "fire" period to enhance the illusion of fire and flames. The flickering light is created by means of a fan-like shield 82 disposed within the base 10 over the red lamp 24 for rotation on a vertical axis. A motor 84 for driving and supporting the rotatable shield is mounted upon a bracket 86 extending from and secured to the box 20 in the rear of the base 12. As the shield 82 rotates over the red lamp 24, the blades thereof intermittently cut off the light projecting upwardly into the model building 10 so as to cause the illusion of flickering light or flames.

As will be observed in the wiring diagram of Fig. 6, the light shield motor 84 is connected in parallel relationship with the red or "fire" lamp 24. Thus, the motor 84 is energized and the light shield is rotated during the "fire" period of the cycle when the red lamp is burning. It will also be observed that another electrical lamp 88 is connected in parallel with the red lamp 24 and that still another lamp 90 is connected in parallel with the white lamp 22. The lamps 88 and 90 are preferably used to light advertising signs or the like, the lamp 88 and its sign being lighted during the "fire" period of the cycle while the lamp 90 and its sign are lighted during the "normal" period of the cycle.

It is believed that a more detailed discussion or explanation of the operation of the apparatus is unnecessary in view of the foregoing description of the elements thereof. From the foregoing description, it should be readily apparent that when the start switch 30 is closed, the smoke producing heater or resistor 72 is energized and after a time delay while heat is produced, the thermoresponsive switch 31 is closed to energize the timer motor 26 which remains energized during the entire period of operation. During each revolution of the timer motor 26, the switch 28 is placed in engagement with the contact 38 for a timed period to energize the white light 22, this being the period of the "normal" operation. At the end of the said "normal" period, the timer motor 26 places the switch 28 in engagement with the contact 40 to energize the red light 24 and the light flickering shield motor 84. During continued operation of the apparatus, there is continuous switching between timed periods of "normal" and "fire" operation. The connecting rod 42 for operating the loading arm 48 which carries the smoke producing material to the heater is connected to the timing cam 32 in such a position that the smoke producing material will be heated to produce the smoke-like gas at the time the "fire" period commences or shortly thereafter. The timing is such and the amount of smoke producing substance submitted to the heater is limited so that the smoke will dissipate at or shortly after the end of the "fire" period when the red light is extinguished.

Thus, the smoke producing apparatus will continue to operate for long periods of time without repair or maintenance. In order to assure operation for a desirably long period of time, a supply bottle 92 of the smoke producing substance 58 may be provided, preferably externally of the base 12, and connected as by a tube 94 with the internally disposed tank 56. The only maintenance necessary after long periods of use consists of refilling or replacing the supply bottle 92.

The invention claimed is:

1. Apparatus for creating the illusion of fire within a display model building and comprising an electric motor connectible with a power source, an electrical resistance heater connectible with said source, an electric lamp for providing a red light for simulating fire within the building, circuit means connecting the said lamp with the source and including a switch adapted to energize and to de-energize the lamp, a rotatable cam operated by said motor and engaging said switch to energize and to de-energize the lamp during each revolution of the cam, and means for introducing a substance to the heater whereby to produce a smoke-like gas, the said means comprising a movable loader associated with the heater and motion transmitting means connecting the loader with the motor so as to introduce a quantity of the substance to the heater in timed relationship to operation of the lamp.

2. Apparatus for creating the illusion of fire within a display model building and comprising an electrical motor connectible with a power source, an electrical resistance heater connectible with said source, an electric lamp for providing a red light for simulating fire within the building, circuit means connecting the said lamp with the source and including a switch adapted to energize and to de-energize the lamp, a rotatable cam operated by said motor and engaging said switch to energize and to de-energize the lamp during each revolution of the cam, and means for introducing a substance to the heater whereby to produce a smoke-like gas, the said means comprising a movable loader operatively associated with the heater and motion transmitting means connecting the loader with the rotatable cam so as to introduce a quantity of the substance to the heater during each revolution of the cam and in timed relationship to operation of the lamp.

3. Apparatus for creating the illusion of fire within a display model building and comprising an electric motor connectible with a power source, an electrical resistance heater connectible with said source, an electric lamp for providing a red light for simulating fire within the building, circuit means connecting the said lamp with the source and including a switch adapted to energize and to de-energize the lamp, a rotatable cam operated by said motor and engaging said switch to energize and to de-energize the lamp during each revolution of the cam, and means for introducing a substance to the heater whereby to produce a smoke-like gas, the said means comprising a tank for containing a quantity of the substance, a loading bucket for lifting a portion of the substance from the tank and for dropping it into the heater, a pivotable loading arm supporting said bucket, and motion transmitting means connecting said motor with said loading arm to introduce a quantity of the substance to the heater during each revolution of the cam and in timed relationship to operation of the lamp.

4. Apparatus for creating the illusion of fire within a display model building and comprising an electric motor connectible with a power source, an electrical resistance heater connectible with said source, an electric lamp for providing a red light for simulating fire within the building, circuit means connecting the said lamp with the source and including a switch adapted to energize and to de-energize the lamp, a second electric motor connected in said circuit means in parallel relationship with said lamp, a rotatable light shield disposed over said lamp and rotatable by said second electric motor whereby to cause the light within the building to flicker and thereby to enhance the illusion of fire within the building, a rotatable cam operated by the first motor and engaging said switch to energize and to de-energize the lamp during each revolution of the cam, and means for introducing a substance to the heater whereby to produce a smoke-like gas, the said means comprising a tank for containing a quantity of the substance, a loading bucket for lifting a portion of the substance from the tank and for dropping it into the heater, a pivotable loading arm supporting said bucket, and motion transmitting means connecting said first motor with said loading arm to introduce a quantity of the substance to the heater during each revolution of the cam and in timed relationship to operation of the lamp.

5. Apparatus for creating the illusion of fire within a display model building and comprising an electric motor connectible with a power source, an electrical resistance heater connectible with said source, an electric lamp for providing a red light for simulating fire within the building, circuit means connecting the said lamp with the source and including a switch adapted to energize and to de-energize the lamp, a rotatable cam operated by said motor and engaging said switch to energize and to de-energize the lamp during each revolution of the cam, and means for introducing a substance to the heater whereby to produce a smoke-like gas, said means comprising a tank for containing a quantity of the substance, a loading bucket for lifting a portion of the substance from the tank and for dropping it into the heater, a pivotable loading arm supporting said bucket, and a connecting arm between said cam and said loading arm capable of generally reciprocable movement which is translated to oscillating movement of the loading arm whereby to introduce a quantity of the substance to the heater during each revolution of the cam and in timed relationship to operation of the lamp.

6. Apparatus for creating the illusion of fire within a display model building and comprising a first electric motor connectible with a power source, an electrical resistance heater connectible with said source, an electric lamp for providing a red light for simulating fire within the building, a circuit means connecting the said lamp with the source and including a switch adapted to energize and to de-energize the lamp, a second electric motor connected in parallel relationship with said lamp, a rotatable light shield disposed over the lamp and rotatable by the second electric motor to cause the light to flicker within the building and further to enhance the illusion of fire, a rotatable cam operated by said first motor and engaging said switch to de-energize and to energize the lamp during each revolution of the cam, and means for introducing a substance to the heater whereby to produce a smoke-like gas, the said means comprising a tank for containing a quantity of the substance, a loading bucket for lifting a portion of the substance from the tank and for dropping it into the heater, a pivotable loading arm supporting said bucket, and motion transmitting means connecting said first motor with said loading arm to introduce a quantity of the substance to the heater during each revolution of the cam and in timed relationship to operation of the lamp.

7. Apparatus for creating the illusion of fire within a display model building and comprising a first electric motor connectible with a power source, a pair of electric lamps one of which provides a normal white light within the building and the other of which provides a red light for simulating fire within the building, circuit means connecting the said pair of lamps with the power source, and including a switch operable in one position to energize one of the lamps and in another position to energize the other lamp, a second electric motor connected in parallel relationship with said other lamp, a rotatable light shield disposed over said other lamp and rotatable by said second electric motor to cause the light from the second lamp to flicker and thereby enhance the illusion of fire within the building, a rotatable cam operated by said first motor and engaging said switch to place the same in said one and other positions in sequence, and means for producing a smoke-like gas during operation of said other lamp, said means comprising an electrical resistance heater connected in parallel relationship with said first motor, a tank for containing a quantity of a substance capable of producing a smoke-like gas when subjected to heat, a loading bucket for lifting a portion of the substance from the tank and for dropping it into the heater, a pivotable loading arm supporting said bucket, and motion transmitting means connecting said cam with said loading arm to oscillate the same and thereby to introduce a quantity of the substance to the heater during each revolution of the cam and in timed relationship to operation of the said other lamp.

8. Apparatus for creating the illusion of fire within a display model building and comprising an electric motor connectible with a power source, a electric lamp for providing a red light for simulating fire within the building, circuit means connecting the said lamp with the power source and including a switch adapted to energize and de-energize the lamp, a rotatable cam operated by said motor and engaging said switch to energize and to de-energize the lamp during each revolution of the cam, and means for producing a smoke-like gas within the model building for passage outwardly through the windows and doors thereof, the said means comprising a container provided with a supply of a substance which produces a smoke-like gas when heated and an electrical resistance heater connectible with the power source for heating portions of the supply of gas producing substance intermittently and in timed relation with energization of said lamp.

9. Apparatus for creating the illusion of fire within a display model building and comprising an electric motor connectible with a power source, an electric lamp for providing a red light for simulating fire within the building, circuit means connecting the said lamp with the power source and including a switch adapted to energize and de-energize the lamp, a rotatable cam operated by said motor and engaging said switch to energize and to de-energize the lamp during each revolution of the cam, means operatively associated with said lamp and causing the light therefrom to flicker whereby to enhance the illusion of fire within the building, and means for producing a smoke-like gas within the model building for passage outwardly through the windows and doors thereof, the said means comprising a container provided with a supply of a substance which produces a smoke-like gas when heated and an electrical resistance heater connectible with the power source for heating portions of the supply of gas producing substance intermittently and in timed relation with energization of said lamp.

References Cited in the file of this patent

UNITED STATES PATENTS

| | | |
|---|---|---|
| 450,615 | Delany | Apr. 21, 1891 |
| 469,652 | Jennings | Feb. 23, 1892 |
| 1,795,004 | Archer | Mar. 3, 1931 |